Nov. 29, 1932.                G. E. GRIMM                 1,889,356
                            AUXILIARY SEAT TOP
                           Filed Feb. 20, 1928          2 Sheets-Sheet 2
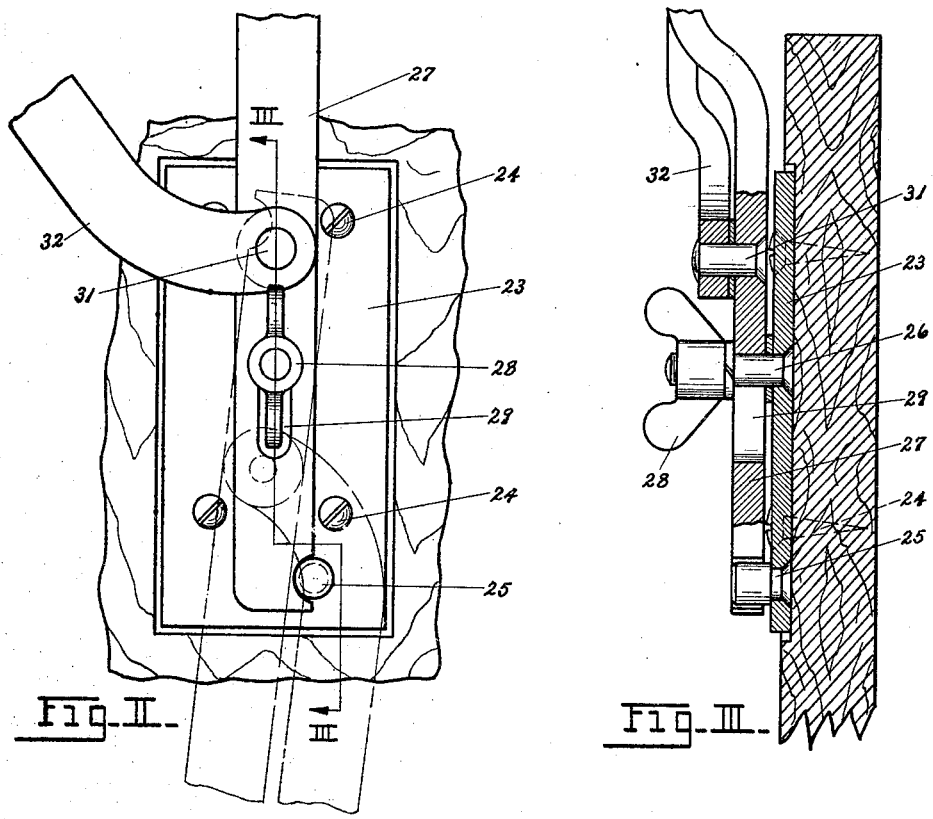
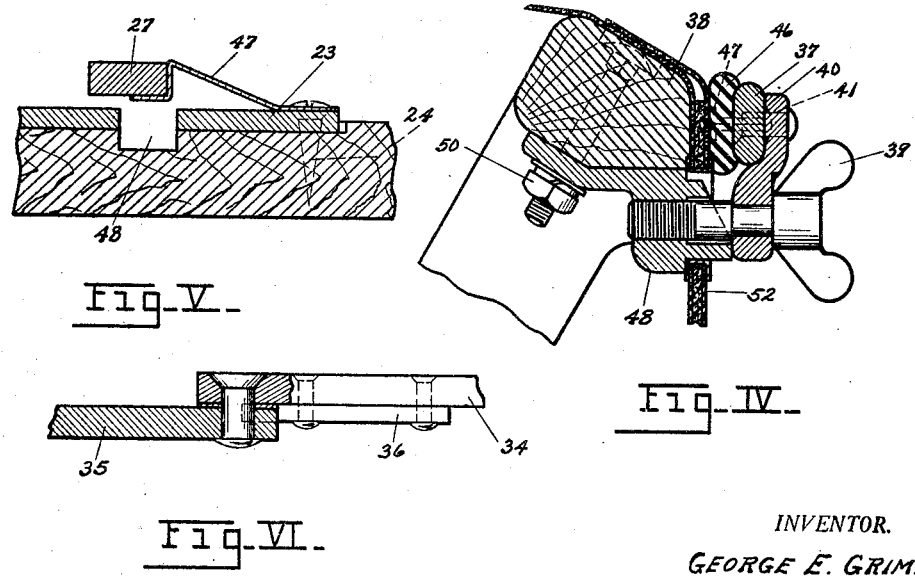
INVENTOR.
GEORGE E. GRIMM.
BY Warren T. Hunt
ATTORNEY.

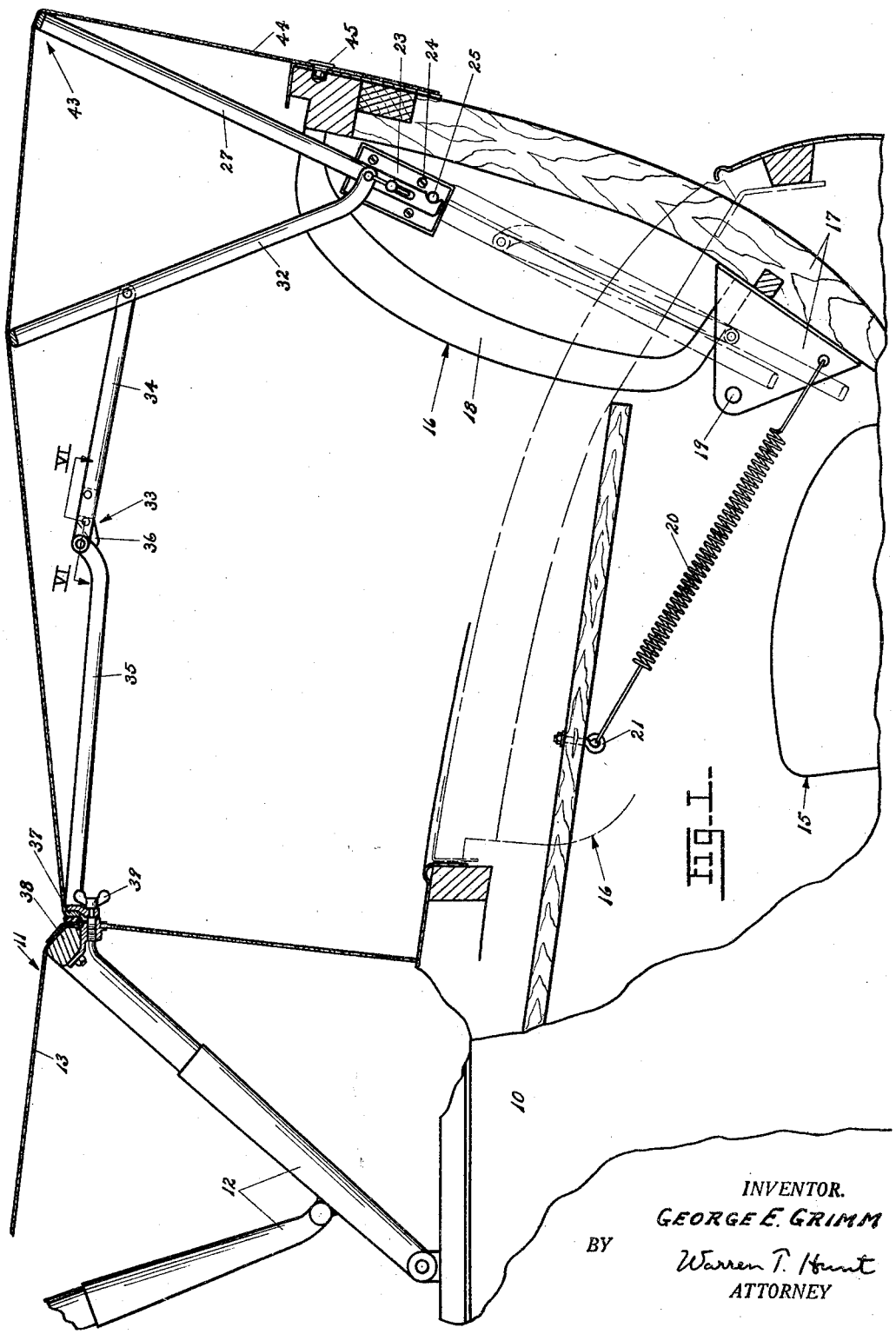

Patented Nov. 29, 1932

1,889,356

UNITED STATES PATENT OFFICE

GEORGE E. GRIMM, OF TOLEDO, OHIO, ASSIGNOR TO THE WILLYS-OVERLAND COMPANY, OF TOLEDO, OHIO, A CORPORATION OF OHIO

AUXILIARY SEAT TOP

Application filed February 20, 1928. Serial No. 255,622.

My invention relates to collapsible frames for vehicle tops, and it has particular relation to tops for rumble seats of automobile vehicles.

One object of the invention is to provide a top structure of the class described which is quickly demountable and in which the frame may be folded or pivoted in and out of operative relation without undergoing the customary assembling operations that have been required heretofore.

Another object of the invention is to provide a top for a rumble seat which may be folded out of its operative position by pivotal movement whereby the lateral members are positioned adjacent the ends of the seat back and the interconnecting members are disposed intermediate the horizontal and vertical seat portions.

In order to construct a seat top which may be folded from its raised position without undergoing a systematic dismantling operation, there is provided a structure whose U-shaped frame members are pivotally secured to each other and to the pivotable seat back portion. These are so disposed as to pivot the lateral members from their normally folded position immediately adjacent the ends of the seat upholstery into a raised position without assembling or fitting any of the members comprising the combination. The portion of the U-shaped members interconnecting the lateral portions and formed integrally therewith are disposed between the horizontal seat portion and the vertical side portion, where they do not interfere with the occupants of the seat.

A better understanding of the principles of the invention may be had by referring to the accompanying drawings illustrating a preferred embodiment, in which Figure I is an elevational view, partly in section, of the top and illustrates its relation to the associated parts of the automobile; the top is shown in its raised position by the full lines and in its folded position by the dotted lines.

Fig. II is an enlarged view of the pivotal connection between the seat structure and the folding frame.

Fig. III is a sectional view of the structure illustrated in Fig. II, taken along the lines III—III in Fig. II.

Fig. IV is an enlarged view of the means for clamping the forwardly extending U-shaped member to the automobile body.

Fig. V is a view of a modification of a portion of the structure illustrated in Figs. III and IV, and Fig. VI is an enlarged view of a portion of the structure illustrated in Fig. I, and taken along the line VI—VI.

Rumble seats are commonly incorporated in automobile body structures of the coupé, roadster and cabriolet types. In the drawings there is illustrated a portion of a roadster body 10 having a conventional top 11 shown in a raised position. The top includes a plurality of vertically inclined pivotal frame members 12 which support a flexible covering material 13.

The rumble seat is disposed immediately to the rear and includes a horizontal upholstered seat portion 15 which is secured to the frame of the body (not shown), and a seat back 16 consisting of a pivotally mounted composite wood and steel frame structure 17 to which is secured seat upholstery 18. The vertical sides of the upholstery are set in or indentured from the ends of the wood and steel parts 17 for purposes hereinafter set forth.

The seat back pivots about a pin 19 which is suitably fixed to the frame portion of the body. A coil spring 20 interconnects one end of the pivotal seat back and an eye screw 21 which is fastened to a frame member and functions to maintain the seat in a raised position. It is to be noted that considerable space intervenes between the rear of the horizontal seat member 15 and the base of the cooperatively disposed seat back member 16. The seat back member is illustrated in full lines in its open position and by dotted lines in the closed position.

A plate 23 is fastened by screws 24 to each side or end of the seat member. Two pins 25 and 26 are secured to each plate, the former of which functions as an abutment member for a vertical U-shaped frame member 27, whereas the other pin 26 is threaded for a winged nut 28 and passes through a slot 29 provided therefor in each end of the vertical U-shaped member.

Adjacent the slotted opening at each end of the U-shaped member there is secured a pin 31 which pivotally supports a forwardly inclined U-shaped member 32. A third U-shaped member 33 having folding arm segments 34 and 35 is horizontally disposed and pivotally secured at its ends to the inclined member 32. A lug 36 riveted to the arm segment 34 is engaged by the other segment 35 which prevents continued counter-clockwise movement from the position illustrated in Fig. 1. The cross member 37 interconnecting the arms of the U-shaped member 33 is clamped to a horizontal composite wood-steel bar 38 forming a part of the frame 11.

The clamping means consists of a winged screw 39 that is rotatably fitted in a depending bracket 40 secured to cross member 37 by rivets 41 or other suitable means. A resilient strip 46 is preferably secured to the cross member 37 by any suitable means such as rivets 47 for preventing chafing of the top fabric and also to form a water tight joint between the folding top and the rear of the conventional top. Two or more of the clamping members are to be preferred, the screws 39 engage a corresponding number of threaded socket members 48 secured by bolts 50 to the horizontal front top member 38. The clamping members are preferably secured to the folding top and are removable therewith so as to leave no unsightly protruding members when the seat is in its folded position.

A canvas or other flexible water-proof material 43 is stretched over the frame and supported on the top of the vertical U-shaped member 27. A portion 44 thereof extends vertically downward and is secured to the back of the seat in any manner such, for example, as a spring button 45. The other end of the canvas passes over the inclined U-shaped member 32 and extends to the cross member 37 where it is held with the aid of a flexible rubber strip 46 which is made integral with the cross member. Obviously, if it is desired, the flexible cover member may be extended downwardly along the sides of the body. Likewise if it is desired, a transparent section may be introduced in the downwardly extending portion to provide for the rear vision.

It is to be noted that counterclockwise movement of the vertical member 27 is prevented by the stop pin 25 which engages the lower extremity of the vertical member. In the modification shown in Fig. V, the pin is omitted and a latch 47 is substituted, which is secured in position by one of the wood screws 24 and may be pressed downwardly into a recess 48 formed in the plate 23 to escape engagement with the vertical member 27.

To take down the top from its operative or raised position, the winged screws 39 are unscrewed completely to enable the removal of the cross member and the downwardly extending portion 44 of the covering material is unfastened at its lower extremity. The inclined arm 32 may then be pivoted into parallel alignment with the vertical arm 27 and the forwardly extending arm 33 pivoted downwardly at its midsection until the two segments 34 and 35 forming the arm are likewise in parallel alignment with the other arms comprising the frame. Thereafter, the winged nuts which secure the position of the vertical members 27 are loosened in order that the frame may be raised slightly to escape the stop pin 25. The frame is thereafter pivoted in a counterclockwise direction through approximately 180° in which position the lateral elements, that is, the arms of the U-shaped members, occupy the space formed between the ends of the seat back 16 and the body, the seat back 16 being inset from the body for this purpose, and, the horizontal members, that is, those interconnecting the arms, are positioned within the space intermediate the two cooperating seat portions 15 and 16. So positioned, the winged screws 28 are tightened leaving the entire frame out of contact and in no wise interfering with the occupants of the seat. It is to be noted that when the frame is in the folded position the seat back 16 may be pivoted into an opened or closed position without interference.

When the modification illustrated in Fig. V is employed, the slot 29 in the vertical member is unnecessary since the latch functions as a stop and may be moved out of engagement with the vertical member by merely depressing the same.

Other modifications will occur to those skilled in the art which fall clearly within the principles of the invention hereinbefore set forth, and it is my desire therefore to limit the invention only as indicated in the appended claims.

I claim:

1. In an automobile having a rumble seat including a substantially horizontal seat portion and a laterally indentured pivoted seat back portion spaced therefrom; a foldable top for said seat comprising a U-shaped frame member; plates mounted at each end of said pivoted seat back portion, said plates having longitudinally arranged slots and projecting portions, the extremities of said U-shaped member being pivotally arranged in said slots and serrations in said U-shaped member engageable with the projections on said plates for positively securing said U-shaped member in raised position; and manual means for clamping the extremities of said U-shaped member into engagement with said plates.

2. In an automobile having a rumble seat including a substantially horizontal seat portion and a laterally indentured pivoted seat back portion spaced therefrom; a foldable top for said seat comprising a U-shaped frame member; plates mounted at each end of said pivoted seat back portion, said plates having perforations therein, the extremities of said U-shaped member being pivotally arranged in said perforations; interlocking means on said U-shaped member and said plates for positively securing said U-shaped member in raised position; and means for clamping the extremities of the U-shaped member into engagement with said plates.

3. In an automobile having a rumble seat including a substantially horizontal seat portion and a laterally indentured pivoted seat back portion spaced therefrom; a foldable top for said seat comprising a U-shaped frame member; plates mounted at each end of said pivoted seat back portion, said plates having slots therein, the extremities of said U-shaped member being pivotally arranged in said slots whereby the U-shaped member may be moved downwardly substantially through an arc of 180 degrees about its pivot to extend when folded downwardly into parallel alignment with the ends of the seat back portion; interlocking means coacting between the extremities of said U-shaped portion said plates for positively securing the U-shaped member in raised position; and manual means for clamping the extremities of the U-shaped member in engagement with said plates in both raised and downwardly extending positions of the U-shaped member.

In testimony whereof, I affix my signature.

GEORGE E. GRIMM.